UNITED STATES PATENT OFFICE.

SIGMUND ADOLF ROSENTHAL, OF LONDON, ENGLAND.

COMPOSITION FOR MATCHES.

SPECIFICATION forming part of Letters Patent No. 663,045, dated December 4, 1900.

Application filed October 9, 1899. Serial No. 733,027. (No specimens.)

*To all whom it may concern:*

Be it known that I, SIGMUND ADOLF ROSENTHAL, electrical engineer, a subject of the Emperor of Germany, residing at No. 37 Walbrook, in the city of London, England, have invented new and useful Improvements in Matches, of which the following is a specification.

My invention relates to improvements in matches, and particularly to the paste used for the heads and to the process for the manufacture thereof. Such matches can be ignited by simple friction on any surface. I absolutely dispense with the use of phosphorus, whether it be yellow phosphorus or amorphous phosphorus, or, indeed, with any phosphorus compound in the mixture for forming the heads of my matches. The use of the poisonous yellow phosphorus in the industry of match-making is well known as being dangerous to the health of the workers, and the use of the red amorphous phosphorus in the manufacture of matches capable of being struck anywhere has also serious drawbacks on account of its treacherous character when in contact with the oxidizing agent, such as chlorate of potash. Now according to my invention all danger or insecurity, or both, in the manufacture are removed, and, further, the actual cost of manufacture is very sensibly cheaper than that of matches heretofore made having phosphorus as a base. My invention further permits of the production of an excellent paste having all the advantages of a paste containing phosphorus; and it consists in combining the thiosulfates or the hyposulfites of copper with the sulfocyanids of copper in suitable proportions. By preference, however, I use the thiosulfate of copper with the sulfocyanid of copper, and to this mixture I add an inert material, such as powdered glass, and a small quantity of sulfate of calcium or peroxid of iron, or both. I may also in some cases add a small quantity of sulfur or sulfid of antimony, or both. I prepare an intimate mixture of all these substances and add a suitable binding material—such as, for instance, a sufficient quantity of glue dissolved in water. To this mixture is then added the oxidizing agent, such as chlorate of potash, in such a proportion as the complete oxidation of the mixture requires. The mixture is then caused to pass several times through a mixing and grinding machine or is otherwise treated so as to render the mixture as uniform as possible and to make the paste perfectly homogeneous. The paste having been brought to a suitable consistency is then ready for the matches or splints to be dipped therein, and, preferably, these latter have been previously paraffined, sulfurized, or stearined.

By the combination of the thiosulfates or hyposulfites of copper with the sulfocyanids of the same metal or metals in the preparation of my paste for forming match-heads I obtain a very great advantage—namely, that the ignition-point of the match is very much lower than if only the thiosulfates or hyposulfites of copper was or were used. My experiments have shown that matches made without the addition of the sulfocyanid of copper have a very high ignition-point and strike only on hard surfaces, and if only the sulfocyanid of copper be used then the combustion on ignition is so rapid, even when diluents are added, that no useful effect can be obtained, while matches made according to my invention even strike on cloth with great facility.

The following ingredients and proportions of ingredients (by weight) are suitable: thiosulfate of copper, five parts; sulfocyanid of copper, ten parts; chlorate of potash, forty parts; powdered glass, nine parts; sulfid of antimony, three parts; sulfate of calcium, three parts; sulfur, (flowers of sulfur,) four parts; ten-per-cent. glue solution twenty-six parts; total, one hundred parts. I do not, however, limit myself either to these exact ingredients nor to these proportions, as the same may be altered without departing from my invention.

What I claim as my invention, and desire to secure by Letters Patent, is—

1. Igniting composition for matches consisting essentially of thiosulfate of copper, sulfocyanid of copper, an oxidizing agent, a gritty filler and a binding agent, in about the proportions set forth.

2. Igniting composition for matches consisting of thiosulfate of copper, sulfocyanid of copper, an oxidizing agent, a gritty filler, sulfid of antimony, calcium sulfate, sulfur and a binding agent in about the proportions set forth.

3. Igniting composition for matches consisting of thiosulfate and sulfocyanid of copper, chlorate of potash, pulverized glass, sulfid of antimony, sulfate of calcium, sulfur and a binding agent in or about in the proportions set forth.

SIGMUND ADOLF ROSENTHAL.

Witnesses:
V. JENSEN,
FRED. HARRIS.